United States Patent [19]
Silverstein et al.

[11] Patent Number: 5,442,467
[45] Date of Patent: Aug. 15, 1995

[54] ENHANCED OFF-AXIS VIEWING PERFORMANCE AND LUMINOUS EFFICIENCY OF A LIQUID CRYSTAL DISPLAY EMPLOYING FIBEROPTIC FACEPLATE ELEMENTS

[75] Inventors: Louis D. Silverstein, Scottsdale, Ariz.; Thomas G. Fiske, Campbell, Calif.; Richard Bruce, Los Altos, Calif.; Robert A. Sprague, Saratoga, Calif.

[73] Assignee: Xerox Corporation, Stamford, Conn.

[21] Appl. No.: 215,454

[22] Filed: Mar. 21, 1994

[51] Int. Cl.⁶ .................. G02F 1/1335; G02B 6/00
[52] U.S. Cl. .................................. 359/42; 359/68; 359/69; 385/901
[58] Field of Search .............. 359/42, 49, 68, 69; 385/129, 130, 132, 901

[56] References Cited

U.S. PATENT DOCUMENTS

| | | | |
|---|---|---|---|
| Re. 33,882 | 4/1992 | Morozumi | 341/702 |
| 2,400,877 | 5/1946 | Dreyer | 88/65 |
| 2,481,380 | 9/1949 | Anderson, Sr. | 229/14 |
| 2,544,659 | 3/1951 | Dreyer | 88/65 |
| 4,183,630 | 1/1980 | Funada et al. | 350/334 |
| 4,344,668 | 8/1982 | Gunther et al. | 350/96.27 |
| 4,349,817 | 9/1982 | Hoffman et al. | 340/784 |
| 4,486,760 | 12/1984 | Funada et al. | 346/107 R |
| 4,558,255 | 12/1985 | Genovese et al. | 313/497 |
| 4,669,813 | 6/1987 | Jeskey | 350/96.10 |
| 4,735,495 | 4/1988 | Henkes | 350/345 |
| 4,752,806 | 6/1988 | Haas et al. | 355/3 R |
| 4,799,050 | 1/1989 | Prince et al. | 340/765 |
| 4,874,227 | 10/1989 | Matsukawa et al. | 350/334 |
| 4,987,043 | 1/1991 | Roosen et al. | 430/7 |
| 5,035,490 | 6/1991 | Hubby, Jr. | 350/337 |
| 5,050,965 | 9/1991 | Conner et al. | 359/53 |
| 5,053,765 | 10/1991 | Sonehara et al. | 340/815.31 |
| 5,066,512 | 11/1991 | Goldowsky et al. | 427/14.1 |
| 5,113,285 | 5/1992 | Franklin et al. | 359/465 |
| 5,131,065 | 7/1992 | Briggs et al. | 385/120 |
| 5,159,478 | 10/1992 | Akiyama et al. | 359/69 |
| 5,181,130 | 1/1993 | Hubby, Jr. | 359/42 |
| 5,229,872 | 7/1993 | Mumola | 359/40 |
| 5,280,371 | 1/1994 | McCartney, Jr. et al. | 359/40 |
| 5,329,386 | 7/1994 | Birecki et al. | 359/42 |

*Primary Examiner*—Anita Pellman Gross
*Assistant Examiner*—Charles Miller
*Attorney, Agent, or Firm*—Oliff & Berridge

[57] ABSTRACT

A transmissive, backlit color twisted-nematic or super-twisted-nematic liquid crystal display employing a front fiber-optic faceplate as a front retaining element of a liquid crystal cell that increases viewing angle between the display and a viewer while minimizing or eliminating undesirable variations in luminance, contrast ratio and chromaticity is described. This novel configuration effectively decouples the liquid crystal cell and other optical elements behind the front fiber optic faceplate from the angular orientation of the viewer with respect to the display. The liquid crystal display described in this invention further provides a high quality color display, without viewing parallax, using a color selection filter mosaic outside of the liquid crystal cell. The display also increases luminous efficiency and improves color saturation by concentrating the transmission of available backlight illumination through the use of a rear fiber-optic faceplate and a second rear-mounted mosaic of color interference filters.

21 Claims, 6 Drawing Sheets

ENHANCED OFF-AXIS VIEWING PERFORMANCE AND LUMINOUS EFFICIENCY OF A LIQUID CRYSTAL DISPLAY EMPLOYING FIBEROPTIC FACEPLATE ELEMENTS

BACKGROUND OF THE INVENTION

1. Field of the Invention

This invention generally relates to a transmissive, rear-illuminated twisted-nematic (TN) color liquid crystal display (LCD) employing a front fiber-optic faceplate that increases the effective viewing angle between the display and a viewer while minimizing undesirable variations in display chromaticity, luminance, and contrast ratio. The invention also increases the luminous efficiency of the LCD by enhancing the collection of the rear illumination from the backlight and minimizing absorption losses in the color selection filters through use of a rear fiber-optic faceplate (FOFP) and an array of interference color filters tuned to the spectral peaks of the backlight.

2. Description of Related Art

A conventional, transmissive direct-view color LCD is composed of a source of illumination and a multitude of layered optical elements which each modify the spectral composition of light originating from the source. Moreover, some of these elements, such as polarizers, retardation films and the liquid crystal (LC) layer itself, are optically anisotropic and birefringent layers which produce complex spectral modifications that vary as a function of the material parameters and construction of the LC cell, display voltage (i.e., luminance or gray level), and the direction of light propagation. The predominant LC cell configuration for high-performance color LCDs is the twisted-nematic cell. In the TN cell, incoming light is initially linearly polarized by an entrance polarizer and then the axis of polarization is optically rotated by the LC layer. The rotation of the axis of polarization is mediated by the bifringence and thickness of the LC layer. The typical twist or rotation angle used for most TN LCDs is 90°, although other twist angles may be used to achieve certain desired optical characteristics. After optical rotation by the LC layer, the polarization state of light exiting the LC layer is analyzed by the exit polarizer or "analyzer." Two principle configurations of TN cell entrance and exit polarizers are used, LCDs that utilize crossed polarizers are often called normally-white (NW) mode LCDs while those consisting of parallel polarizers are typically called normally-black (NB) mode LCDs. For both voltage-controlled gray scale and off-axis viewing, the light path through the LC layer "sees" a different birefringence than in the fully voltage-saturated, on-axis situation. This is due to the fact that the angles at which the light path intercepts the anisotropic LC molecules vary as a function of LC cell voltage and viewing angle. This in turn results in different degrees of stimulation of the ordinary and extraordinary modes of the LC causing varying degrees of phase difference between the two polarization components, different polarization states at exit from the LC cell, and resulting variations in light transmission through the exit polarizer. In addition, phase differences between polarization components and resulting variations in light transmission are wavelength dependent, thereby resulting in chromaticity differences as well intensity or luminance differences. Off-axis viewing adds additional complications due to path length differences through all of the material layers comprising the LCD as well as angle-related reflection and polarization effects at all of the different optical boundaries.

As such, LCDs, and in particular TN color LCDs, exhibit undesirable variations in luminance, contrast ratio and chromaticity as a function of the viewing angle between the display and an observer. Moreover, since both off-axis viewing and voltage-controlled gray scale result in variations in display luminance, contrast ratio and chromaticity, the combination of these two factors further accentuates the anisotropies evident in direct-view TN LCDs. In some instances, i.e., at particular combinations of viewing-angle and voltage-controlled gray level, the contrast ratio of the display may actually reverse and the desired color may shift to a complementary hue. Obviously, these anisotropies in display visual characteristics greatly limit the useful angular viewing cone of the display, especially for direct-view TN color LCDs employing voltage-modulated gray level control. Thus, while this LCD configuration has many desirable operating characteristics and is thus the commonplace for high-performance direct-view color LCDs (often employing an active-matrix addressing substrate to facilitate high-resolution/high-contrast operation), viewing angle limitations severely compromise the ultimate imaging performance achievable with this display device.

A number of potential solutions to ameliorate viewing angle problems in direct-view LCDs have been proposed; including the use of a diffusing optical layer at the output of the LCD, three-dimensional retardation films or optical compensators [e.g., Ong, H. L. (1993). Negative-Birefringence Film-Compensated Multi-Domain TNLCDs with Improved Symmetrical Optical Performance. *SID Digest of Technical Papers*, 658–661], and so-called multi-domain pixel structures [Tanuma, S. (1988). Japan Patent No. 63-106624; Otani, A. (1989). Japan Patent No. 0188520]. The use of a diffusing optical layer (e.g., ground-glass scattering screen) at the output of the LCD would result in a de-coupling of the LCD from the viewing direction; however, such a diffusing element would scatter light from both directions and would severely degrade LCD image contrast under incident ambient illumination, which is typical for most office and outdoor environments. Retardation films or optical compensators can produce some useful improvements in LCD viewing angle; however, the phase retardation imparted to the light propagating through the film is highly wavelength sensitive and can thus only compensate for a limited portion of the visible spectrum. This limits the effectiveness of retardation films or optical compensators when used for improving the viewing angle of full-color displays. Finally, relatively recent developments in multi-domain pixel structures, which are optically self-compensating alignments within the LC cell, can prove to be highly effective at improving the viewing angle of direct-view color LCDs. Unfortunately, such alignments can be difficult to establish precisely and also significantly complicate the manufacture of the LC cell. In addition, there is a tendency for the domain or alignment boundaries to appear as visible borders, patterns and striations in the display, thereby degrading the image quality of the LCD.

Typical color LCD displays use a patterned, mosaic of color selection filters created within the LC cell itself. In addition, a subtractive or stacked color LCD configuration can be created with three sequentially ordered and spectrally-selective LC cells which each subtract or remove an orthogonal component of the visible spectrum. Examples of different configurations of subtractive or stacked color LCDs can be found in U.S. Pat. No. 5,032,007 to Silverstein et. al., U.S. Pat. No. 4,917,465 to Conner et. al., and U.S. Pat. No. 4,416,514 to Plummer. While successful as a full-color LCD light valve for projection displays in which the light rays passing through the stack of subtractive cells are collimated or at least telecentric, the subtractive or stacked LCD arrangement is not desirable for use with a backlit, direct-view LCD due to viewing-angle problems arising from the parallax produced by the relatively thick stack of spectrally-selective cells. For these reasons, spatial-additive color synthesis and the planar mosaic of color selection filters are preferred approaches to fullcolor direct-view color LCDs. Examples of mosaic color filters are shown in U.S. Reissue No. 33,882 to Morozumi, U.S. Pat. No. 4,987,043 to Roosen et al. and U.S. Pat. No. 5,066,512 to Goldowsky et al.

Conventional processing or creation of the patterned mosaic of color selection filters within the LC cell is costly, inefficient and severely limited by material compatibilities with the LC fluid. These filters are placed within the LC cell, which typically has a cell gap width on the order of 3 to 7 microns, in order to reduce viewing parallax in displays with small pixel dimensions. Placing the color selection filters outside of the LC cell would require that the filters be displaced from the pixel-forming apertures within the LC cell a minimum distance equal to the thickness of the LC cell glass, which is typically on the order of approximately 1100 microns. This would result in very significant viewing parallax between a pixel aperture and the associated color selection filter, such that at off-axis viewing angles light rays from an addressed pixel could easily go through the incorrect color selection filter (e.g., light rays from an addressed RED pixel aperture actually going through a GREEN color selection filter).

As such, there exists a need for improved color filter processing and placement; allowing easier processing, the use of more efficient filter materials, and increased color image quality over a larger viewing angle range. If an optical means could be developed to control or constrain the angles at which light propagated through the layers of a direct-view LCD until the final optical interface where the light rays may be expanded to provide a wide viewing angle (thereby effectively decoupling the LCD from the viewing orientation), then absorptive color selection filters could be placed outside the LC cell or highly-efficient, interference-type color selection filters could be employed. In either case, this would enable the color filters to be located on a different optical layer than the LC cell, processed using a wider range of more efficient color filter materials and processing stages, and should result in improved manufacturing yields, reduced production costs, and significantly improved LCD color performance and luminous efficiency.

Fiber-optic faceplates (FOFPs) have been used for contrast enhancement on special-purpose Cathode Ray Tube (CRT) displays, as light-collection elements on the front surface of reflective monochromatic LCDs to enhance the reflected luminance of the display, as light channeling elements for coupling patterned color phosphor mosaics to their respective pixel apertures in rear-illuminated color LCDs, and as image relay elements for coupling the output of image generation devices to photo-recording surfaces for hard-copy applications. Several patents relate to FOFPs. These include U.S. Pat. No. 4,344,668 to Gunther et al.; U.S. Pat. No. 4,349,817 to Hoffman et al.; U.S. Pat. No. 4,558,255 to Genovese et al.; U.S. Pat. No. 4,752,806 to Haas et. al.; U.S. Pat. No. 4,799,050 to Prince et al.; U.S. Pat. Nos. 5,035,490 and 5,181,130, both to Hubby, Jr; U.S. Pat. No. 5,050,965 to Conner et al.; U.S. Pat. No. 5,053,765 to Sonehara et al.; U.S. Pat. No. 5,113,285 to Franklin et al.; and U.S. Pat. No. 5,131,065 to Briggs et al.

Haas et. al. uses a FOFP to channel light emerging from an LC layer to a lens array and then to a photoreceptor. Genovese et. al. use a FOFP to channel light emitted by a vacuum fluorescent device to expose a photosensitive member for a printing device. These applications do not relate to direct-view display devices.

Briggs et. al. use a front FOFP to channel light emerging from an emissive phosphor layer to a viewer in order to create a high luminance and high contrast thinfilm electro-luminescent display. Prince et. al. employ a FOFP as a light channeling element for coupling the emissions of a patterned color phosphor mosaic excited by an ultra-violet source to their respective pixel apertures in a rear-illuminated color LCD. These patents relate to the channeling of phosphor emissions in direct-view display devices and are not directly concerned with the improvement of off-axis viewing.

Hubby, Gunther et. al., and Hoffman et. al. all relate to reflective LCD devices that use a FOFP to collect incident light from a wider acceptance angle for the purposes of enhancing the reflected luminance and contrast of the display. This approach does not address the generation of color in an LCD and, in fact, is not applicable to a color LCD because there is not sufficient reflected luminance in such a LCD device to enable color separation and filtering and still provide enough output luminance for comfortable viewing. Moreover, this approach is not concerned with enhancing off-axis viewing performance.

Conner et. al. relates to a super-twisted nematic (STN) LCD that requires a collimated light source and uses sequentially-stacked subtractive color LC cells. The primary approach is intended for projection display applications. When applied to the direct-view situation, the display output requires decollimation or diffusion. This results in degraded image contrast and color desaturation under ambient illumination. This approach does not directly address high-performance, direct-view, transmissive TN color LCDs.

None of these references appreciate the problems overcome by the present invention.

OBJECTS AND SUMMARY OF THE INVENTION

It is an object of the invention to minimize or eliminate off-axis viewing angle problems with direct-view LCD displays, particularly color displays, allowing homogeneous, high-quality image representation over a broad viewing-angle range.

It is another object of the invention to enable the placement of a mosaic of color selection filters outside of the LC cell of a color LCD, providing improved manufacturability of the LCD and the ability to utilize a broader range of more efficient and spectrally selective color filter materials, thereby improving color performance and luminous efficiency, even when viewed off axis.

It is yet another object of the invention to decouple the effective birefringence of the LC cell and optical path length effects of most optical layers comprising the LCD from an observer's viewing orientation, preventing an observer from seeing light rays passing through the LC cell and most other optical layers at other than a small cone of angles around the normal or perpendicular to the LCD.

It is a further object of the invention to allow light to pass through the LC cell and most other LCD optical elements at a limited angle while expanding output and/or input angles to a much wider cone, providing a wider viewing angle than existing color LCDs without undesirable variations in contrast, chromaticity and luminance.

These and other objectives and advantages are provided, in a first embodiment of the invention, by a direct-view rear-illuminated LCD device, comprising: a backlight source; a rear diffuser layer; a rear polarizer; a LC cell including a rear glass layer with addressing elements and indium tin oxide (ITO) transparent pixel electrodes, a LC layer having a top and bottom surface, and a front FOFP as a front containing element of the LC cell and being located directly in contact with the top surface of the liquid crystal layer; a mosaic array of color absorption filters either deposited on the front face of the FOFP or located on a separate but adjacent substrate; and a front polarizer or analyzer. The front FOFP provides for a relatively narrow light acceptance solid angle ($\theta_{Max}IN$) at a rear face adjacent the LC layer and a relatively wide light exit or output solid angle ($\theta_{Max}OUT$) at a front face opposite the rear face.

In s second embodiment, the front polarizer or analyzer is located within the LC cell adjacent to the rear or input face of the front FOFP. This configuration provides for analysis of the polarization state of light exiting the LC cell prior to input to the front FOFP and is designed to eliminate the impact of any significant depolarization resulting from reflections within the FOFP fibers and thereby degrading display contrast. In this case, the front polarizer or analyzer may be a thin polarization coating or a thin film composed of aligned organic dye molecules which is deposited or bonded directly on the rear or input face of the front FOFP.

Third and fourth embodiments further add a rear FOFP, located between the diffuser and the LC cell, to the configurations of the first and second embodiments. The rear FOFP is opposite of the front FOFP and includes an input face, facing and adjacent to the diffuser, that provides a high $\theta_{Max}IN$ resulting in a relatively wide light input acceptance angle and an output face opposite the input face providing a low $\theta_{Max}OUT$ and resulting in a relatively narrow light exit or output angle. The principal objective of the rear FOFP is to provide increased collection of light from the rear illumination source, thereby providing an improvement in the luminous efficiency of the LCD.

Fifth and sixth embodiments further add a mosaic array of spectrally-selective color interference filters or holographic filters, located between the rear FOFP and the rear polarizer, to the configurations of the third and fourth embodiments. The principal objective of the mosaic array of color interference or holographic filters is to provide a narrow spectral bandpass matched to the primary red, green, and blue spectral emission peaks of the rear illumination source. These filters are spatially registered with the red, green, and blue elements of the pixel array and transmit narrow-band light to the appropriate pixel. Illumination outside of the spectral band of each filter is reflected back through the rear FOFP to the diffuser, which then reflects the light back to the filter array via the rear FOFP. Thus, the light is effectively "recycled" until it passes through a filter with the appropriate spectral bandpass. Since spectral interference and holographic filters are angle sensitive, the rear FOFP restricts the angle of incidence from the rear illumination source and diffuser. This additional array of color selection filters minimizes absorption losses in the primary color selection filter array at the front of the display device by restricting the spectral bandpass of light propagating through the LCD optical layers and color absorption filters of the primary color selection filter array, thereby providing an improvement in both the luminous efficiency and color performance of the direct-view color LCD.

The invention solves the LCD viewing angle problem by utilizing the front FOFP as a front cover plate and containing element of a LC cell, in direct contact with the LC fluid material or optionally an integral thin-film polarizer, eliminating a front glass substrate. This FOFP relays the polarized light rays emerging from the plane of the optically active LC material forward to another image plane at the exit apertures of the FOFP fibers. This effectively decouples the LC layer and other LCD optical layers behind the front FOFP from the viewing orientation of the display observer, in that the observer views the light rays emerging from the image plane relayed by the FOFP. If the rays propagating through the LC layer are only accepted by the FOFP through a narrow cone of angles (i.e., a low $\theta_{Max}IN$), then the observer will only see the optical effects of the LC layer and other LCD optical elements as they would appear through a narrow viewing cone around the normal to the LCD regardless of viewing orientation relative to the coupled FOFP. If the light rays are made to diverge at the output from the FOFP or coupled additional layers of approximately index matched materials (i.e., a relatively high $\theta_{Max}OUT$), then a relatively wide range of satisfactory viewing angles can be maintained for the transmissive direct-view display. The image formed by light rays propagating in a narrow cone of angles around the normal or perpendicular to the exit plane of the LC layer can then be viewed from any reasonable angle. Since the image is relayed directly from the output of the LC layer by the FOFP, this configuration has the added benefit that absorptive color selection filters may be located at the output of the FOFP rather than in the LC cell itself. This may be accomplished by either direct deposition on the output surface of the FOFP or by placement of the filters on a substrate adjacent to the FOFP output surface. This simplifies filter processing and cell construction and enables greater latitude in the color filter materials which can be used as well as their spectral-selection performance.

The front and rear FOFPs comprise an array of individual optical fibers which are fused together with an interstitial cladding material and then cut and polished to a desired thickness to form a plate. The creation of FOFPs with varying optical characteristics is well known in the art. The optical fibers are designed to transmit through total internal reflection light incident at controlled input or acceptance angles while rejecting or absorbing light incident at larger angles. Light entering the fibers of the rear FOFP is collected over a wide acceptance angle $\theta_{Max}IN$ by use of a high numerical aperture (NA) FOFP and/or coupling to a boundary of low refractive index (e.g., air) and light exiting the optical fibers of the front FOFP is made to diverge or exit over a relatively wide angle $\theta_{Max}OUT$ also by use of a high NA and/or the ultimate coupling to a low refractive index boundary. FOFPs with low NAs and/or coupling to relatively high refractive index materials (e.g., plastic, polyimide, or optical glass) restrict the light output exit angle $\theta_{Max}OUT$ of the rear FOFP and the light input acceptance angle $\theta_{Max}IN$ of the front FOFP, respectively.

The combination of low and high $\theta_{Max}IN$ and $\theta_{Max}OUT$ at the appropriate interfaces as described creates remarkable property results. An observer can view the display at a relatively large range of viewing angles with only minimal variation in LCD image contrast and chromaticity as a function of viewing angle, unlike the inhomogeneities and anisotropies observed with a typical direct-view transmissive color LCD. Further, light from a rear illumination source is allowed to enter the rear FOFP at a relatively wide acceptance angle which is channelled down to a relatively narrow exit angle as it reaches the output face of the rear faceplate and travels through the display optics. Once past the output face of the rear FOFP, the light is in a relatively narrow beam as it travels through the optics. Then, when it reaches the output face of the front FOFP the beam is again expanded to a relatively wide cone or solid angle, providing a wide viewing angle. Thus, the use of the rear FOFP achieves an increase in the amount of light collected from the source and transmitted through the LCD optics, thereby providing some improvement in the luminous efficiency of the display over the single front FOFP configuration of the invention.

The important features controlling $\theta_{Max}IN$ and $\theta_{Max}OUT$ are the NA of the FOFP and the refractive index of optical materials or layers at the boundary with the FOFP. The NA is a value which expresses the light gathering power of an optical fiber in much the same manner as the f/number of a lens system. The basic relationships between NA, $\theta_{Max}$, and the refractive index (N) of boundary materials or layers are described in the following equations which are well known in the art:

$$NA = N_O \sin\theta_{max} = \sqrt{N_{fib}^2 - N_{clad}^2}$$

where:
NA=numerical aperture of FOFP
$\theta_{max}$=FOFP maximum solid angle of acceptance or exit $$\theta_{max} = \arcsin\left(\frac{1}{N_O}\sqrt{N_{fib}^2 - N_{clad}^2}\right)$$

$N_o$=refractive index of surrounding material or boundary
$N_{fib}$=refractive index of optical fiber
$N_{clad}$=refractive index of fiber cladding It is also necessary to calculate the angle of refraction for light rays which exit the FOFP, propagate through several optical layers, and finally exit the LCD at the final optical interface with air. For these rays, the angle of refraction can be calculated for each optical boundary and a final estimate obtained for the angular distribution of light at the exit of the LCD. The following equation enables the calculation of the angle of refraction at the boundary between two optical media having indices of refraction $N_1$ and $N_2$, where $N_1$ is the refractive index of the first media and $N_2$ is the refractive index of the second media:

$$\theta_{ref} = \arcsin\left[\left(\frac{N_1}{N_2}\right)\sin\theta_{inc}\right]$$

where:
$\theta_{ref}$=angle of refraction
$\theta_{inc}$=angle of incidence
$N_1$=refractive index of first optical media
$N_2$=refractive index of second optical media Thus, it can be seen that the NA of a FOFP is solely a function of the refractive indices of the optical fibers ($N_{fib}$) and cladding ($N_{clad}$), while the light acceptance solid angle ($\theta_{Max}IN$) and the light exit or output solid angle ($\theta_{Max}OUT$) of a FOFP are also a function of the refractive indices ($N_o$) of the material(s) at the respective boundaries of the FOFP. For the present invention, preferred values for $\theta_{Max}$ to provide a low or narrow angular distribution of light are $\theta_{Max} \leq 30°$ and preferred values for $\theta_{Max}$ to provide a high or wide angular distribution of light are $\theta_{Max} \geq 50°$.

Preferred embodiments will become apparent from a reading of the following detailed description in connection with the drawings.

BRIEF DESCRIPTION OF THE DRAWINGS

The invention will be described in detail with reference to the following drawings wherein.

DETAILED DESCRIPTION OF PREFERRED EMBODIMENTS

Figure 1:
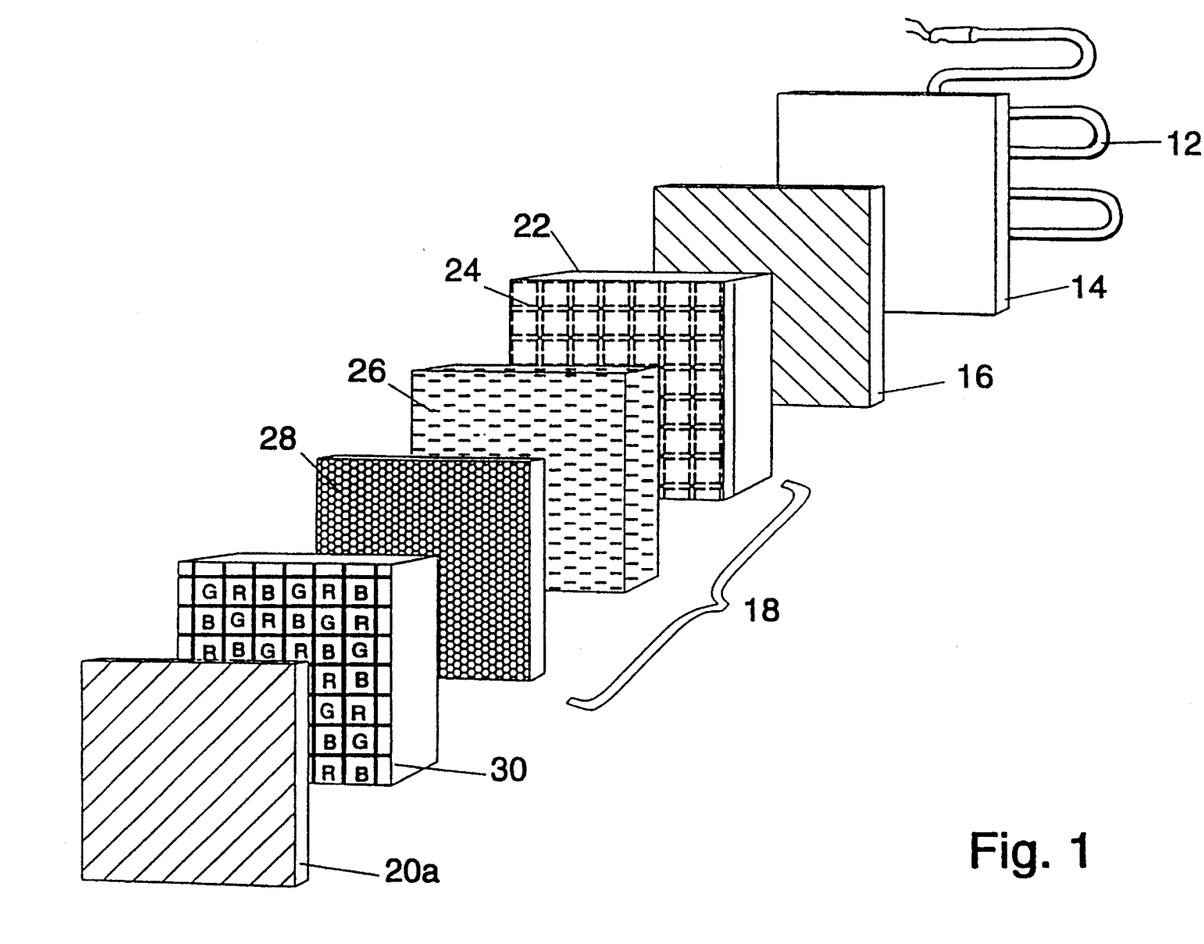
FIG. 1 shows an exploded view of a direct-view, transmissive, backlit color LCD display having a front FOFP according to a first embodiment of the invention.

A first embodiment of an LCD employing a novel configuration is shown in FIG. 1 and will now be described in greater detail. A direct-view, backlit transmissive color LCD display includes a backlight source 12, preferably a tri-band hot- or cold-cathode fluorescent lamp with light collection and distribution optics, a diffuser 14, a rear linear polarizer 16, a LC cell 18, a mosaic array of color selection filters 30, and a front linear polarizer or analyzer 20a. The LC cell 18 includes a rear glass layer 22 having matrix addressing elements 24 and ITO pixel electrodes, a LC layer 26, preferably containing a TN LC material, and a front retaining element 28. Front retaining element 28, which typically has been a front glass layer, is a FOFP according to this invention.

Common electrode ITO and alignment polyimide are deposited on the rear surface of FOFP faceplate 28 and it is used in conjunction with rear cover glass layer 22 and associated matrix addressing elements 24 to contain LC layer 26. FOFP 28 is made up of a plurality of individual optical fibers, which are fused with appropriate cladding material and then cut and polished to the desired thickness. FOFP 28, in direct contact with the front of LC layer 26, relays the light rays propagating through the LC layer forward to another image plane at the exit or front surface of FOFP 28.

Normally, because of the optical properties of the LC material and polarizers as well as optical path length effects through all materials comprising the LCD, off-axis viewing results in substantially varying image contrast, chromaticity and other characteristics. However, FOFP 28 transmits via total internal reflection the light passing through the liquid crystal layer for rays within a restricted solid angle determined by the NA of the FOFP and the refractive indices of the materials bounding the FOFP. This prevents a viewer from seeing directly into the LCD from any viewing orientation because the FOFP 28 decouples the LC layer and other optical elements behind it from the light rays exiting the front surface of the FOFP. Thus, the image relayed by the FOFP as viewed by an observer over a relatively large range of off-axis angles is the same as that created by a directly viewed LCD (without the FOFP) over a much narrower range of angles. The result is that enhanced contrast and color performance, as well as greater homogeneity in the appearance of the display, can be obtained over a wider range of viewing angles.

The FOFP 28 according to the invention has a rear (input) face, adjacent to LC layer 26, with a specific NA. For example, with a NA of 0.80 and a LC refractive index of approximately 1.6, $\theta_{max}\text{IN}=\arcsin[(1/1.6)0.8]=30°$, thereby restricting the light transmitted by the FOFP to a relatively narrow solid angle of 30°. Light rays outside of the solid angle $\theta_{Max}\text{IN}=30°$ will be absorbed via extramural absorption (EMA) in the cladding material of the FOFP. Since only a relatively narrow cone of light rays propagating through the LC layer are transmitted by the FOFP, only rays at angles which result in a relatively high contrast and good color performance are transmitted to the output face of the FOFP. At the output face of the FOFP, a relatively high refractive index of approximately the same value of the LC material occurs at the output boundary of the FOFP as well as in subsequent optical layers of the LCD. Thus, $\theta_{Max}\text{OUT}=\theta_{Max}\text{IN}=30°$. Assuming that all optical layers on the output side of the FOFP are of materials with a refractive index of about 1.6 (e.g., linear polarizer and color absorption filters) and that these layers are bonded together with an index matching adhesive material, then light will propagate through these subsequent layers at approximately the same angles as those at output from the FOFP with a $\theta_{Max}\text{OUT}=30°$. At the final optical interface of the LCD with air, the solid angle of light rays exiting the LCD will expand according to the angle of refraction produced at the final optical interface of the LCD, $\theta_{ref.}=\arcsin[(1.6/1.0)\sin 30°]53.13°$. Thus, $\theta_{Max}\text{OUT}$ for the entire LCD, or the effective viewing angle of the direct-view LCD according to the present invention, is equal to 53.13°. For this first embodiment, then, a restricted solid angle of light rays propagating through the LC layer and other previous optical layers and yielding the good contrast and color performance of this restricted solid angle is expanded at the final optical interface of the LCD to provide good contrast and color performance over a much larger solid angle at output.

In order for the image produced by the present invention to appear sharp and focused and to prevent optical crosstalk between adjacent pixels (which would also result in degradation of color performance when a spatial mosaic of color filters is utilized for color selection in a color LCD), it is important for the input face of the FOFP to be in close proximity to the pixel-forming plane of the display. That is, the distance between the input face of the FOFP and the pixel-forming plane of the LCD must be small compared with the size of a display pixel. Since the pixel-forming plane of the LCD is the LC layer and typical pixel sizes are in the range of 100 to 400 microns, the present invention places the input face of FOFP 28 in very close proximity to the LC layer, separated only by the ITO and LC alignment layers, which are each typically only several hundred Angstroms in thickness. This requires that FOFP 28 maintain the polarization state of light propagating through the LC cell as initially polarized by input polarizer 16 and optically rotated by the TN or STN configuration of LC layer 26 such that it can be appropriately analyzed by output polarizer or analyzer 20a to produce the light modulating function of LC cell 18. Thus, FOFP 28 must be constructed from optical fibers which do not disturb substantially the polarization state of light propagating through the FOFP. If such polarization is substantially disturbed by internal reflections within the FOFP, then the contrast of the LCD will be degraded.

Fiber-optic faceplates of various sizes and NAs, including those constructed with polarization-maintaining optical fibers, can be obtained through Incom Inc.-Fiber Optic Div., of Southbridge, Mass.; Galileo Electro-Optics Corp., of Sturbridge, Mass.; and Schott Fiber Optics, Inc., of Southbridge, Mass. In addition, specialty optical fibers with various optical characteristics and polarization preserving properties are available from 3M Specialty Optical Fibers of West Haven, Conn.

According to a preferred first embodiment, the display is a high quality, direct-view color LCD and includes a mosaic color filter array 30 consisting of a plurality of red, green and blue filter elements, each corresponding to a pixel of the display. The number of filter elements in the array depends on the resolution and the size of the display.

Preferably, mosaic color filter array 30 is composed of a mosaic of color absorption filters which enable relatively homogeneous color selection over a broad range of viewing angles. A spectral absorption filter works by taking the input from a relatively broad-band source of illumination and absorbing, via suspended dyes or pigments, selected portions of the broad-band spectrum. Thus, the absorption filter transmits those portions of the input spectrum which are not absorbed by the dyes or pigments. If, for example, the filter was a red filter, it would transmit light within the long-wavelength or red region of the visible spectrum while absorbing other portions of the spectrum such as the green and blue regions. Standard color absorption filters constructed using glass or plastic binding materials are well known in the art and are available from a wide range of manufacturers.

As previously described, there are problems associated with locating filter 30 within the LC cell itself. Standard glass or plastic filters cannot be used to create the filter mosaic and specialized thin-film color absorption filter materials must be used and deposited directly in stages (for each color) on the internal surface of the LC cell substrate or containing element, for example the internal surface of either the front or rear cell glass of a typical color LCD. Such processing or coating is typically accomplished using spin coating, which severely limits the materials that can be chosen for the filter. Additionally, the filter has to be processed when forming the cell and the filter materials must be compatible with the LC material or an additional passivation layered formed by another processing step. Color absorption filter materials for use in constructing thin-film color filter mosaics are available from a number of sources, including Brewer Sciences, Inc. of Rollo, Mo., as well as Nitto Denko and Toppan both of Japan.

Additionally, there are problems with placing a color filter mosaic outside of the cell in a typical color LCD, such as a direct-view color TN LCD. The gap between the color filter and the LC layer results in parallax when viewed off-axis, resulting in incorrect registration between display pixels and their respective color filters. As such, a typical, high-resolution color LCD demands placement of the color filter mosaic within the LC cell.

However, because this invention utilizes a FOFP as a front retaining element for the LC cell, the pixel-forming plane of the LC layer is relayed or guided to the output face of FOFP 28. Accordingly, color filter mosaic 30 composed of thin-film color absorption materials can be deposited directly to the front or output face of FOFP 28 or, alternatively, a separate substrate containing a mosaic of color absorption filters can be bonded directly to the front (output) face of FOFP 28, between FOFP 28 and front polarizer or analyzer 20a, with little or no misregistration due to angular parallax between LCD pixels and their respective color filters.

The ability to locate the mosaic of color filters outside of the LC cell allows a much greater variety of filter materials to be selected, such as glasses, plastics, gelatins or other filter materials. This can result in improved LCD color performance since more spectrally selective filters materials can be utilized and can also reduce processing costs because the filter can be processed separately from the LC cell.

Figure 2:
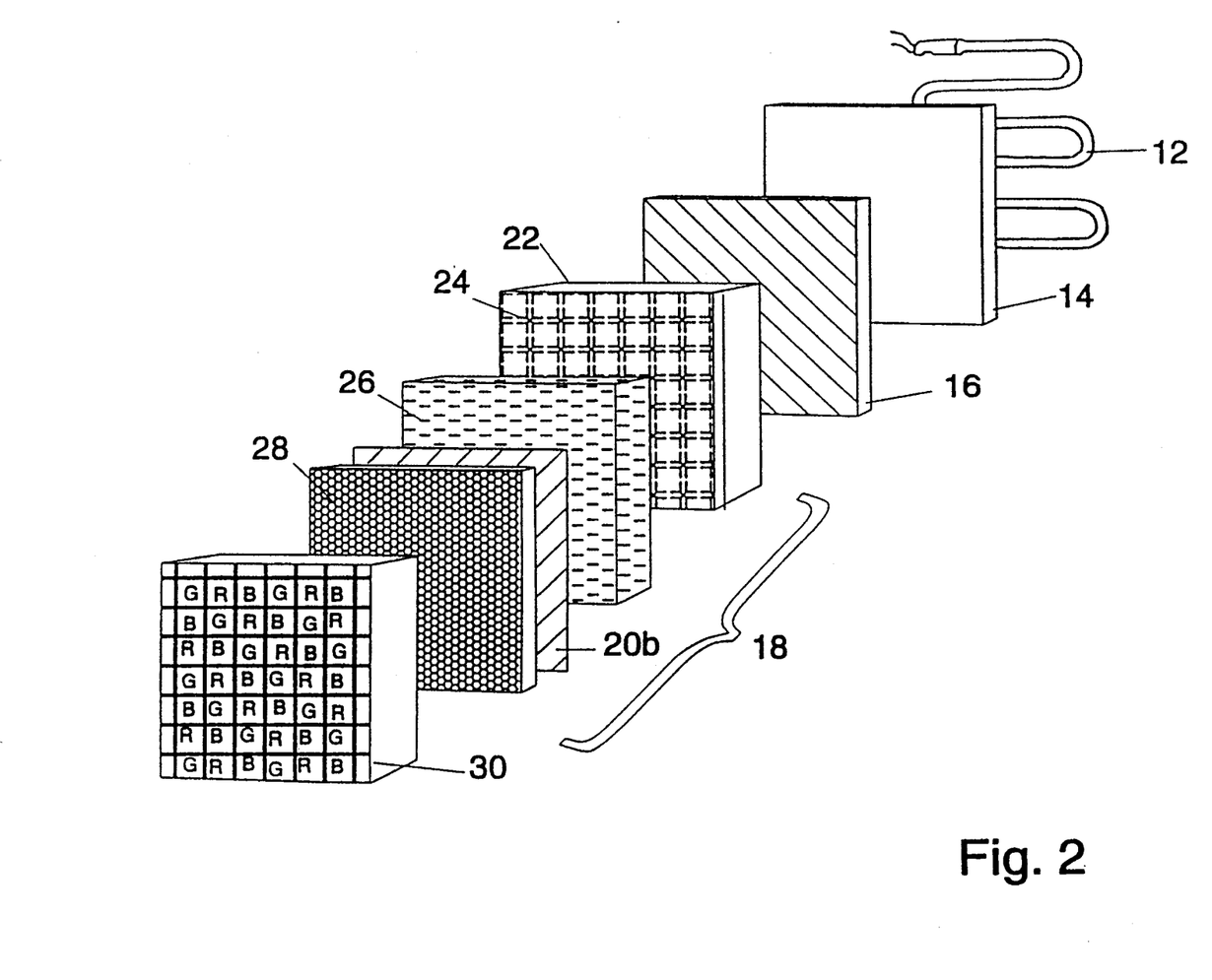
FIG. 2 shows an exploded view of the display of FIG. 1 but incorporating a polarizer integral to the LC cell and adjacent to the input surface of the front FOFP according to a second embodiment of the invention.

Front polarizer or analyzer 20a is a linear sheet polarizer of the same construction and characteristics as rear polarizer 16. Suitable sheet polarizers of various thicknesses and extinction ratios can be obtained from a range of suppliers including Nitto and Sanritzu, both of Japan and Polaroid Corp., of Cambridge, Mass. A second embodiment of the present invention is illustrated in FIG. 2, wherein front polarizer or analyzer 20a of the first embodiment is replaced by front polarizer or analyzer 20b located within LC cell 18 adjacent to the input face of FOFP 28. This alternative configuration enables analysis of the polarization state of light exiting the LC layer prior to entering FOFP 28, thereby avoiding any potential degradations in LCD contrast resulting from depolarization in the optical fibers of the front FOFP. However, since the pixel-forming plane is within the LC layer, the thickness of internal front polarizer or analyzer 20b must be relatively small compared to the size of the LCD pixels. Since LCD pixel sizes will in general range from approximately 100 to 400 microns, typical high-efficiency sheet polarizers which range in thickness from about 150 to 250 microns can not be employed for front integral polarizer 20b without loss of image sharpness and optical crosstalk between adjacent pixels. According to the teachings of U.S. Pat. No. 5,181,130 to Hubby and U.S. Pat. Nos. 2,400,877; 2,481,380; and 2,544,659 to Dreyer, internal front polarizer 20b can be formed by a thin layer of aligned organic dyes to maximize the ratio of pixel size to polarization layer thickness. Polarization layers formed by such processes can be within the range of 0.5 to 50 microns. In addition, thin polarizer coatings can be obtained from Sterling Optics of Williamstown, Ky.

Figure 3:
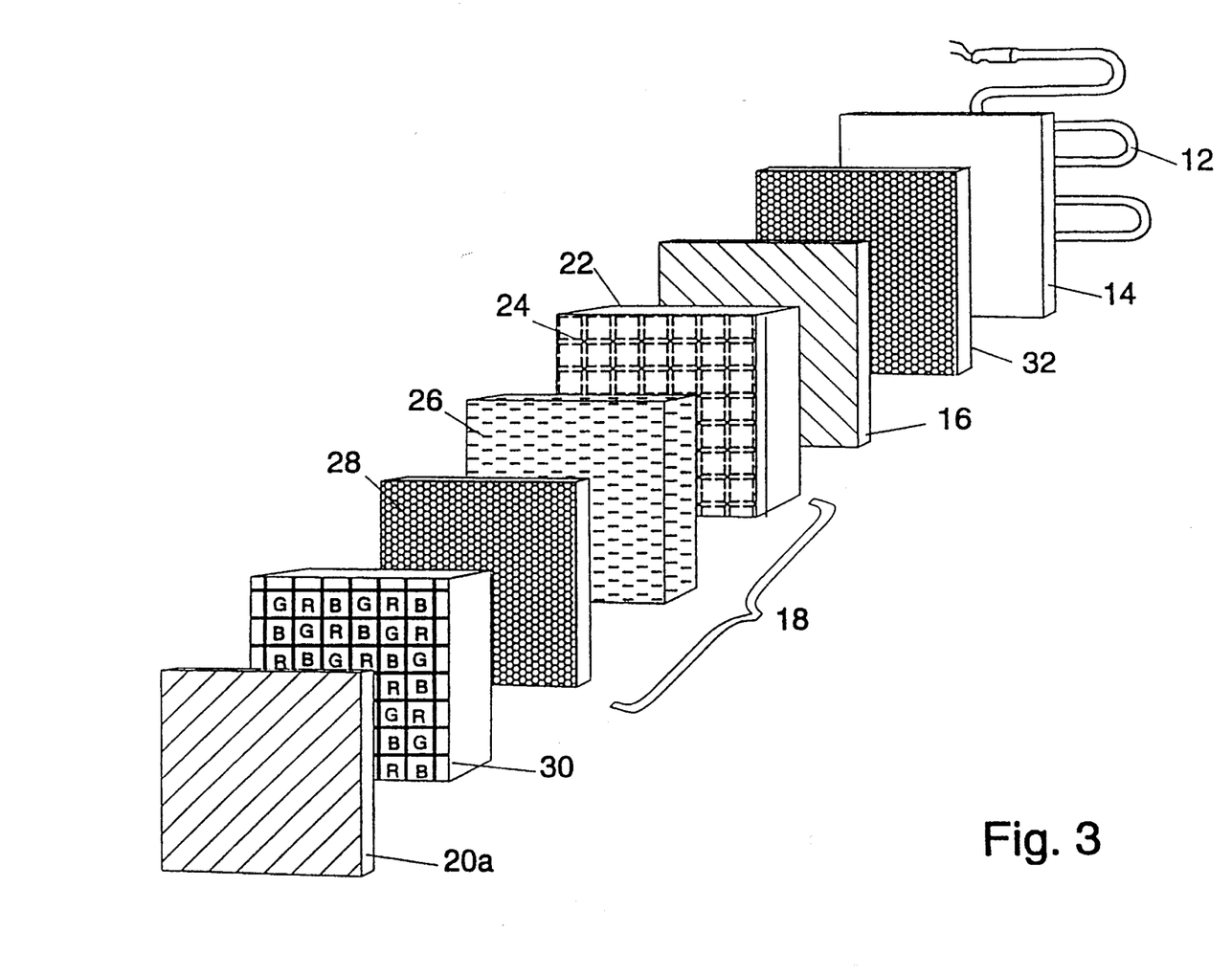
FIG. 3 shows an exploded view of the display of FIG. 1 but further including a rear FOFP for improving the collection of light from the backlight and diffuser according to a third embodiment of the invention.
Figure 4:
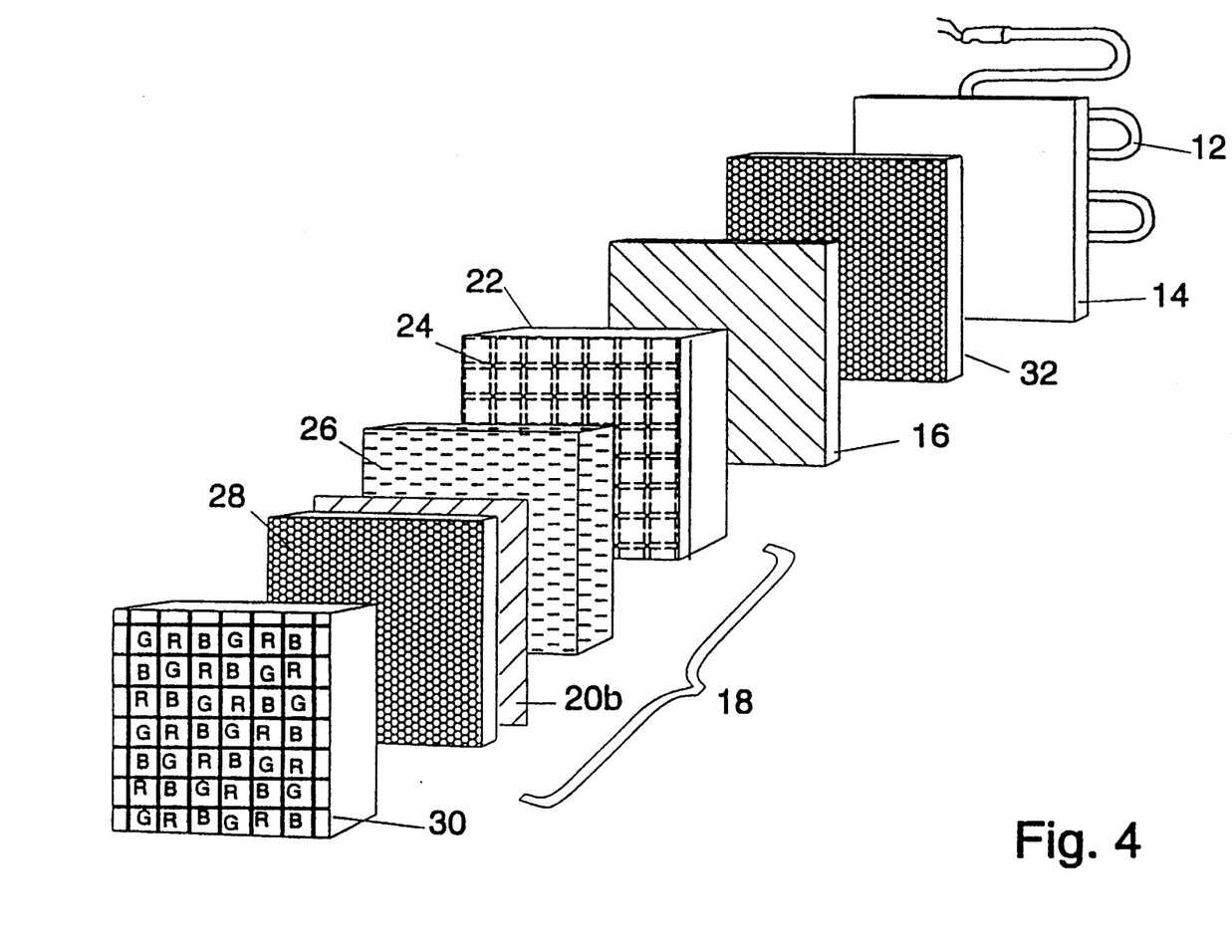
FIG. 4 shows an exploded view of the display of FIG. 2 but further including a rear FOFP for improving the collection of light from the backlight and diffuser according to a fourth embodiment of the invention.

An even further improved direct-view LCD display can be achieved according to a third and fourth embodiment of the invention by addition of a rear FOFP 32 between rear polarizer 16 and diffuser 14, as illustrated in FIGS. 3 and 4. By incorporating a rear FOFP 32 with an input surface facing diffuser 14 and bounded by air, and an output face bonded to rear linear sheet polarizer 16 which possesses a relatively high refractive index of approximately 1.6, a noticeable increase in the luminous efficiency of the LCD can be achieved via improved angular collection of light emitted from rear-illumination source 12 and diffused by optical diffuser 14.

In the first embodiment, off-axis light with an angle of incidence $<\theta_{Max}IN$ for the front FOFP 28 is not totally internally reflected by the optical fibers and is lost by absorption via EMA in the cladding material of the FOFP. In the calculated example, $\theta_{Max}IN$=approximately 30°. Thus, only light within a solid angle of 30° is transmitted by FOFP 28 while light rays outside of this solid angle are wasted for the purposes of generating a luminous image at the output of the LCD. By locating the additional rear FOFP 32 between the diffuser 14 and rear polarizer 16 with the bounding refractive indices as described above and by using a FOFP with a NA of 0.80 for example, $\theta_{max}IN$=arcsin [(1/1.0)0.8]=53.13° at the input to rear FOFP 32 and $\theta_{max}OUT$=arcsin [(1/1.6) 0.8]=30° at the output of rear FOFP 32. Light is accepted or collected over a much wider solid angle by inclusion of FOFP 32 and then exits with little or no loss at a solid angle which approximately matches that of front FOFP 28. This effectively "concentrates" the available light emitted from rear-illumination source 12 and diffused by optical diffuser 14, thereby improving the luminous efficiency of the LCD and providing a brighter display image. The third and fourth embodiments, illustrated in FIGS. 3 and 4, respectively, reflect the incorporation of rear FOFP 32 into the first and second embodiments of the invention.

While the third and fourth embodiments of the invention further improve the luminous efficiency of the LED over the first and second embodiments, the absorption filters of the color filter mosaic 30 still contribute significant losses in luminous efficiency since this type of filter achieves color selection by absorbing unwanted wavelengths. Given that a relatively broadband spectral input composed of the full input spectrum of the display is passed through each of the primary color filters (e.g., red, green, and blue) composing filter mosaic 30, each filter will absorb or waste approximately two-thirds of the available light it receives (e.g., a red absorption filter will pass long-wavelength or red light but absorb middle-wavelength or green light and short-wavelength or blue light). Despite these inefficiencies, absorption filters are used for color selection in virtually all direct-view color LEDs since they can provide good color performance over a broad range of viewing angles. Much more efficient color selection filters can be found in multi-layer dielectric interference filters or holographic types of filters, which also have the useful property of reflecting wavelengths outside of their pass band rather than absorbing them. However, since such filters operate by changing phase relations between transmitted and reflected light waves resulting in constructive and destructive interference, they are extremely sensitive to optical path length effects and thus the angle of incidence of incoming light. The restricted angles over which such filters operate effectively limit their utility for color selection in typical direct-view color LEDs.

The use of a rear FOFP 32 in embodiments three and four of the present invention restricts the solid angle of light at the exit surface of the FOFP and therefore allows for a unique use of interference or holographic types of filters to improve the luminous efficiency and color performance of a color LED. Embodiments five and six of the present invention, illustrated in FIGS. 5 and 6, respectively, incorporate a mosaic array of color interference or holographic types of filters 34 between rear FOFP 32 and rear linear polarizer 16 of embodiments three and four. In principle, and depending on the optical configuration of LED materials, filter mosaic 34 can be located at different positions between rear FOFP 32 and front filter 30. Mosaic 34 contains red, green and blue filter elements, directly corresponding to array 30 in resolution and location of individual elements such that a red element of filter mosaic 34 corresponds to a red element of filter 30 at any given pixel location. Suitable interference filter materials of high spectral selectivity can be obtained from Optical Coating Laboratories, Inc., of Santa Rosa, Calif. Highly selective filter materials produced by holographic processes are also available and can be obtained from the Optical Element Venture of DuPont Imaging Systems, of Wilmington, Del.

Figure 5:
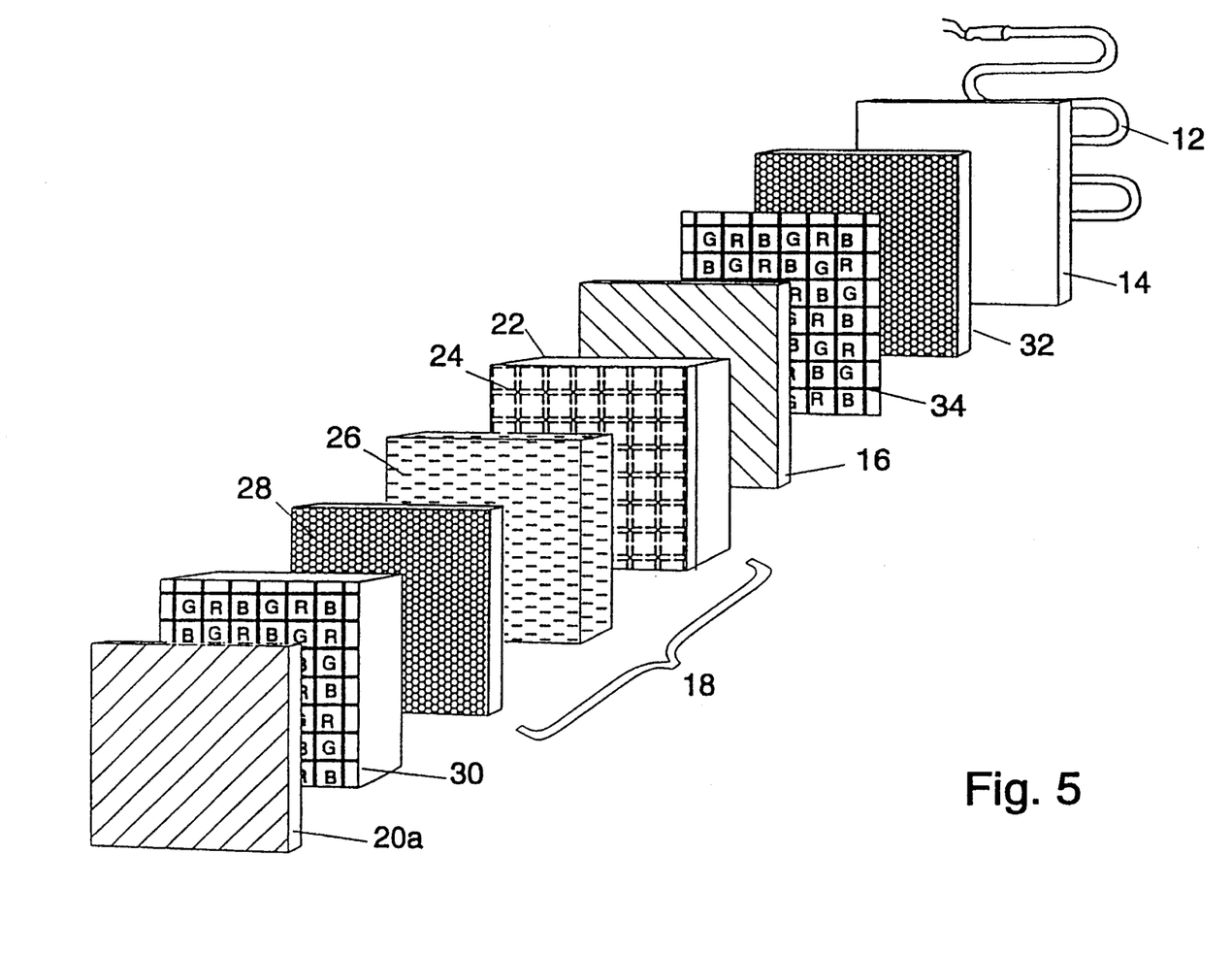
FIG. 5 shows an exploded view of the display of FIG. 3 but further including a mosaic array of color interference or holographic filters between the rear polarizer and the rear FOFP for improving luminous efficiency and display color performance according to a fifth embodiment of the invention.
Figure 6:
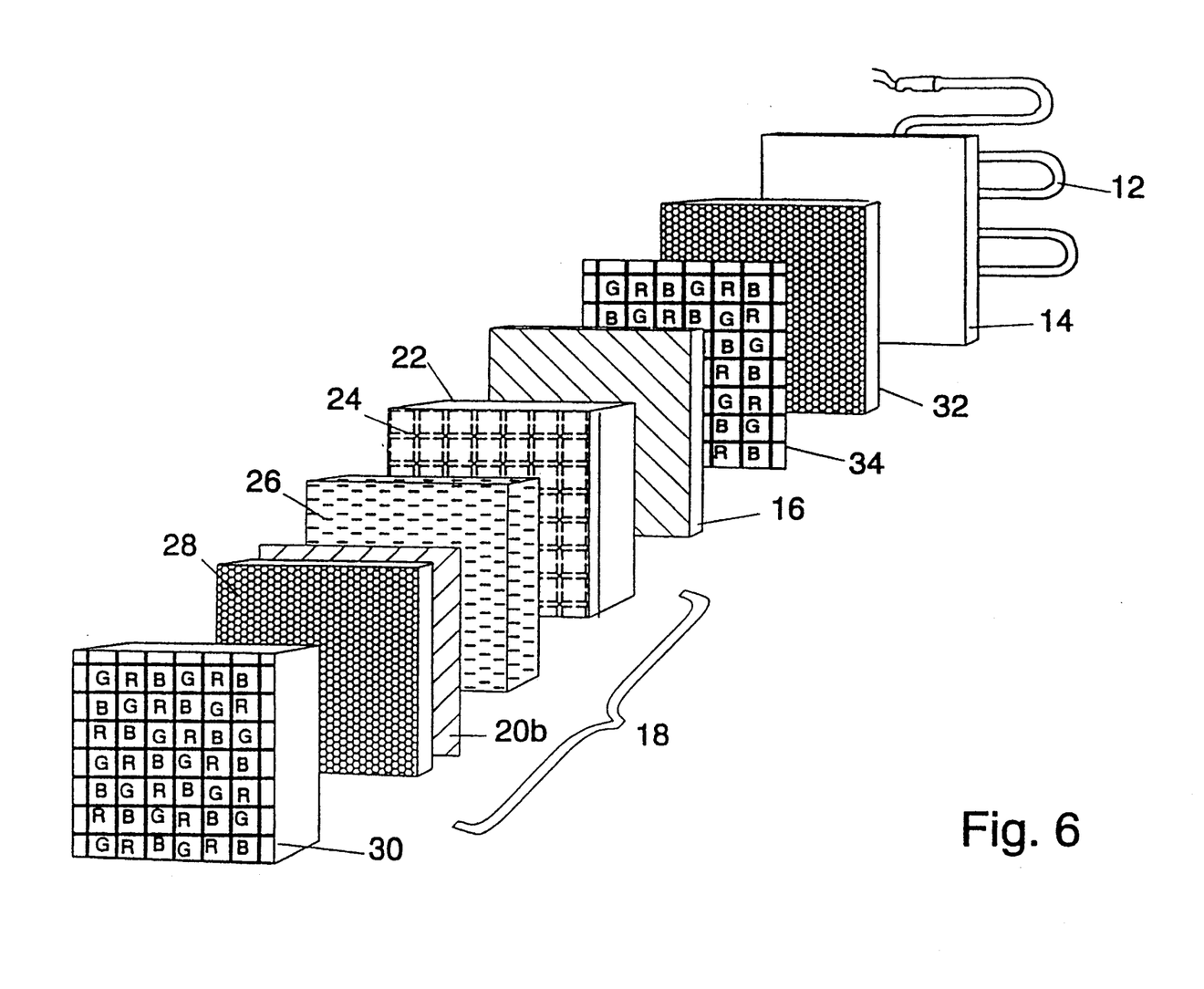
FIG. 6 shows an exploded view of the display of FIG. 4 but further including a mosaic array of color interference or holographic filters between the rear polarizer and the rear FOFP for improving luminous efficiency and display color performance according to a sixth embodiment of the invention.

The mosaic of interference or holographic filters 34 functions to improve LCD luminous efficiency and color performance in the following manner. If, for example, light of long visible wavelength (red) encounters an element of mosaic 34 which is tuned to transmit long wavelength light (red filter), this wavelength is transmitted through the filter. However, rather than absorbing the medium (green) and short (blue) visible wavelengths, the red interference or holographic filter element reflects these wavelengths back through rear faceplate 32. These reflected wavelengths again encounter diffuser 14, which scatters and reflects these wavelengths back through rear FOFP 32 to filter mosaic 34 where they again have a probability of encountering a filter element of mosaic 34 which will transmit long-wavelength or red light. This process continues until the light eventually encounters a filter with the correct pass band for longwavelength light, and the same process occurs for the medium (green) and short (blue) wavelengths. Further, because the filter elements of mosaic array 34 correspond directly to filter elements of absorption filter mosaic 30, they perform a "pre-selection of wavelength or color" such that the corresponding absorption filter elements of mosaic 30 perform only a "final selection or tuning of wavelength or color" and there is relatively little absorption occurring in the elements of filter mosaic 30. Thus, these final embodiments make better use of the available light and result in even higher luminous efficiency and improved color performance of the LCD while still maintaining a wide viewing angle.

The invention has been described with reference to the preferred embodiments thereof, which are illustrative and not limiting. Various changes may be made without departing from the spirit and scope of the invention as defined in the appended claims.

What is claimed is:

1. A direct-view, rear-illuminated liquid crystal display device, comprising in sequential order:
    a backlight source;
    a rear diffuser layer;
    a rear linear polarizer; and
    a liquid crystal cell including a rear glass layer with addressing elements and pixel ITO electrodes, a liquid crystal layer and a front fiber-optic faceplate as a front containing element substantially adjacent to said liquid crystal layer, said front fiber-optic faceplate having a small light input acceptance cone at a rear face adjacent to said liquid crystal layer and a large light output exit cone at a front face opposite said rear face to improve a viewing angle through the liquid crystal display device.

2. The direct-view liquid crystal display device of claim 1, wherein a mosaic of color selection filters is located outside of said liquid crystal cell.

3. The direct-view liquid crystal display device of claim 1, further comprising a mosaic array of color absorption filters located on said front face of said front fiber-optic faceplate.

4. The direct-view liquid crystal display device of claim 1, further comprising a front polarizer adjacent to said front fiber-optic faceplate.

5. The direct-view liquid crystal display device of claim 4, wherein said front polarizer is located outside of said liquid crystal cell adjacent to said front face of said fiber-optic faceplate.

6. The direct-view liquid crystal display device of claim 1, wherein said front polarizer is located within said liquid crystal cell adjacent to said rear face of said fiber-optic faceplate.

7. The direct-view liquid crystal display device of claim 1, wherein the light input acceptance cone on said rear face is substantially less than the light output exit cone on said front face.

8. The direct-view liquid crystal display device of claim 1, wherein the light output exit cone on said front face is substantially greater than the light input acceptance cone on said rear face.

9. The direct-view liquid crystal display device of claim 1, wherein said liquid crystal layer is comprised of twisted nematic material.

10. The direct-view liquid crystal display device of claim 1, wherein said liquid crystal layer is comprised of super-twisted nematic material.

11. The direct-view liquid crystal display device of claim 1, further comprising a rear fiber-optic faceplate located between said rear diffuser and said rear polarizer.

12. A direct-view backlit liquid crystal display device, comprising in sequential order:
   a backlight source;
   a rear diffuser layer;
   a rear fiber-optic faceplate, said rear fiber-optic faceplate having a large light input acceptance cone at a rear face adjacent to said diffuser and a small light output exit cone output at a front face opposite said rear face;
   a rear polarizer; and
   a liquid crystal cell including a rear glass layer with addressing elements and pixel ITO electrodes, a liquid crystal layer and a front fiber-optic faceplate as a front containing element substantially adjacent to said liquid crystal layer, said front fiber-optic faceplate having a small light input acceptance cone at a rear face adjacent to said liquid crystal layer and a large light output exit cone at a front face opposite said rear face to improve a viewing angle through the liquid crystal display device.

13. The direct-view liquid crystal display device of claim 12, further comprising a front polarizer located outside of said liquid crystal cell adjacent to said front face of said front fiber-optic faceplate.

14. The direct-view liquid crystal display device of claim 12, further comprising a front polarizer located within said liquid crystal cell adjacent to said rear face of said front fiber-optic faceplate.

15. The direct-view liquid crystal display device of claim 12, wherein the light input acceptance cone on said rear face of said rear fiber-optic faceplate is substantially greater than the light output exit cone on said front face of said rear fiber-optic faceplate.

16. The direct-view liquid crystal display device of claim 12, wherein the light output exit cone on said front face of said rear fiber-optic faceplate is substantially less than the light input acceptance cone on said rear face of said rear fiber-optic faceplate.

17. The direct-view liquid crystal display device of claim 12, wherein said liquid crystal layer is comprised of twisted nematic material.

18. The direct-view liquid crystal display device of claim 12, wherein said liquid crystal layer is comprised of super-twisted nematic material.

19. A direct-view backlit liquid crystal display device, comprising in sequential order:
   a backlight source;
   a rear diffuser layer;
   a rear fiber-optic faceplate, said rear fiber-optic faceplate having a large light input acceptance cone at a rear face adjacent to said diffuser and a small light output exit cone output at a front face opposite said rear face;
   a rear polarizer;
   a liquid crystal cell including a rear glass layer with addressing elements and pixel ITO electrodes, a liquid crystal layer and a front fiber-optic faceplate as a front containing element substantially adjacent to said liquid crystal layer, said front fiber-optic faceplate having a small light input acceptance cone at a rear face adjacent to said liquid crystal layer and a large light output exit cone at a front face opposite said rear face to improve a viewing angle through the liquid crystal display device;
   a mosaic array of color absorption filters located on said front face of said front fiber-optic faceplate; and
   a front polarizer.

20. The direct-view liquid crystal display device of claim 19, further comprising a mosaic array of color interference filters or spectrally-selective holographic filters between said rear fiber-optic faceplate and said rear polarizer, said array of color interference or holographic filters corresponding exactly with said array of color absorption filters such that corresponding elements of each array correspond to same color elements of the other array and to same color pixels of the display device.

21. The direct-view liquid crystal display device of claim 19, further comprising a mosaic array of color interference filters or spectrally-selective holographic filters located between said rear fiber-optic faceplate and said front fiber-optic faceplate, said array of color interference or holographic filters corresponding exactly with said array of color absorption filters such that corresponding elements of each array correspond to same color elements of the other array and to same color pixels of the display device.

* * * * *